United States Patent Office 3,435,030
Patented Mar. 25, 1969

3,435,030
17-ALKENYL/ALKYNYL-5α-ANDROST - 1 - ENE-3β, 17β-DIOLS, ESTERS THEREOF AND INTERMEDIATES THERETO
Paul D. Klimstra, Northbrook, Ill., assignor to G. D. Searle & Co., Chicago, Ill., a corporation of Illinois
No Drawing. Continuation-in-part of application Ser. No. 468,578, June 30, 1965. This application Mar. 9, 1966, Ser. No. 532,874
Int. Cl. C07c *173/00, 169/20;* A61k *17/00*
U.S. Cl. 260—239.55                           10 Claims

ABSTRACT OF THE DISCLOSURE

17 - alkenyl/alkynyl - 5α - androst-1-ene-3β,17β-diols and esters thereof useful as pharmacological agents as evidenced by their hormone-like activity, e.g., androgenic and anabolic, and intermediates in the manufacture thereof.

This application is a continuation-in-part of my copending application Ser. No. 468,578, filed June 30, 1965.

The present invention relates to novel steroidal derivatives characterized by a double bond at the 1,2 position and by an unsaturated aliphatic hydrocarbon substituent at the 17 position and, more particularly, to 17-alkenyl/alkynyl-5α-androst-1-ene-3β,17β-diols and esters thereof represented by the following structural formula:

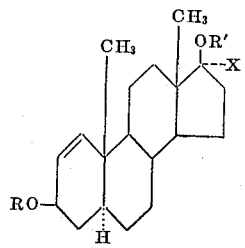

wherein R and R' can be hydrogen or a lower alkanoyl radical and X is a lower unsaturated aliphatic hydrocarbon radical.

The lower alkanoyl radicals symbolized by R and R' in the structural formula shown above are typified by formyl, acetyl, propionyl, butyryl, valeryl, caproyl, heptanoyl and the branched-chain groups isomeric therewith.

The lower unsaturated aliphatic hydrocarbon radicals encompassed by the X term are lower alkynyl radicals such as ethynyl, propynyl, butynyl, pentynyl, hexynyl and heptynyl and lower alkenyl radicals such as vinyl, propenyl, butenyl, pentenyl, hexenyl and heptenyl together with the corresponding branched-chain isomers.

The compounds of this invention are conveniently manufactured by utilizing starting materials within the scope of the following structural formula:

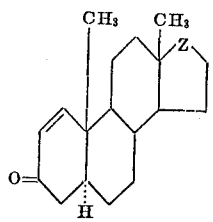

wherein Z is a carbonyl, hydroxymethylene or (lower alkanoyl)oxymethylene radical. 17β-acetoxy-5α-androst-1-en-3-one, for example, is converted to 5α-androst-1-ene-3β,17β-diol 17-acetate by reduction with lithium tri-(tertiary-butoxy) aluminum hydride in tetrahydrofuran solution. The reaction of that mono-ester in methylene chloride with dihydropyran in the presence of p-toluenesulfonic acid affords the corresponding 3-tetrahydropyran-2-yl ether. Hydrolysis of the 17-ester function is effected by heating with aqueous potassium hydroxide in methanol, thus producing 3β-tetrahydropyran-2-yloxy-5α-androst-1-en-17β-ol. Oxidation of that 17-hydroxy compound, typically with aluminum isopropoxide and cyclohexanone in toluene, affords 3β-tetrahydropyran-2-yloxy-5α-androst-1-en-17-one. Removal of the tetrahydropyran-2-yl group is suitably accomplished by reaction with a strong acid such as p-toluenesulfonic acid to yield 3β-hydroxy-5α-androst-1-en-17-one. When that intermediate is allowed to react with a lower alkyne or a source thereof, the instant 17α-alkynyl-17β-ols are produced. As a specific example, 3β-hydroxy-5α-androst-1-en-17-one is contacted with acetylene and potassium tertiary-amylate to afford 17α-ethynyl-5α-androst-1-ene-3β,17β-diol.

The aforementioned novel intermediate, i.e., 3β-hydroxy-5α-androst-1-en-17-one, is alternatively produced by utilizing 5α-androst-1-ene-3,17-dione as the starting material. The 17-keto group is selectively ketalized, as is exemplified by reaction with 2-ethyl-2-methyl-1,3-dioxolane to yield the 17-ethylene ketal. Reduction of that substance with a suitable reducing agent such as lithium aluminum hydride results in conversion of the 3-keto group with the 17-ketal protecting moiety remaining intact. Removal of that protecting group is conveniently achieved by heating with concentrated hydrochloric acid in ethanol, thus affording the desired 3β-hydroxy-5α-androst-1-en-17-one.

A third process whereby the instant compoudns are conveniently manufactured utilizes 17β-hydroxy-5α-androst-1-en-3-one as the starting material. The 17-hydroxy substituent is converted to a 17-tetrahydropyran-2-yloxy group by reaction with dihydropyran and a catalytic quantity of p-toluenesulfonic acid, and the 3-keto function is reduced, suitably with lithium aluminum hydride, thus affording 5α - androst - 1 - ene - 3β,17β-diol 17-tetrahydropyran-2-yl ether. Acylaton of that substance with a lower alkanoic acid anhydride or halide, preferably in the presence of a suitable acid acceptor, results in the corresponding 3-(lower alkanoates). The use of acetic anhydride and pyridine, for example, yields 5α-androst-1-ene-3β,17β-diol 3-acetate,17-tetrahydropyran-2-yl ether. Removal of the tetrahydropyran-2-yl group from those intermediates produces the corresponding 3,17-diol 3-(lower alkanoates) as is exemplified by the reaction of 5α-androst-1-ene-3β, 17β-diol 3-acetate,17-tetrahydropyran-2-yl ether with p-toluenesulfonic acid in methanol to yield 5α-androst-1-ene-3β,17β-diol 3-acetate. Oxidation of the 17-hydroxy group of those intermediates with a suitable oxidizing agent yields the corresponding 17-keto intermediates. The latter 5α-androst-1-ene-3β,17β-diol 3-acetate is thus contacted in acetone with aqueous chromic acid to afford 3β-acetoxy-5α-androst-1-en-17-one. Those 3-mono-esters can be alkynylated directly to produce the instant 17α-alkynyl-3,17-diols, the 3-alkanoyl group being removed concomitantly under the alkaline reaction conditions. 3β-acetoxy-5α-androst-1-en-17-one is thus allowed to react with lithium acetylide in the form of its ethylene diamine complex, in that manner affording 17α-ethynyl-5α-androst-1-ene-3β,17β-diol.

The 17α-(lower alkenyl) derivatives of this invention are suitably produced by partial reduction of the corresponding 17α-(lower alkynyl) compounds. That conversion can be effected by catalytic hydrogenation with a palladium-on-carbon catalyst in a suitable solvent such as pyridine. That process is specifically illustrated by the partial catalytic hydrogenation of 17α-ethynyl-5α-androst- 1-ene-3β,17β-diol to yield 17α-vinyl-5α-androst-1-ene-3β,17β-diol, utilizing 5% palladium-on-carbon as the catalyst and pyridine as the solvent.

When the instant 3,17-diols are contacted with a lower alkanoic acid anhydride or halide at room temperature, the corresponding 3-mono-(lower alkanoates) are produced, while reaction with those reagents as elevated temperature results in the corresponding 3,17-bis-(lower alkanoates). At room temperature, the reaction of 17α-ethynyl-5α-androst-1-ene-3β,17β-diol with acetic anhydride in pyridine thus yields the 3-monoacetate while reaction at the reflux temperature of the mixture produces the 3,17-diacetate.

The 17α-alkenyl/alkynyl compounds of the present invention are useful as a result of their valuable pharmacological properties. In particular, they are hormonal agents in consequence of their ability to avoke anabolic and androgenic responses.

As is apparent from the foregoing disclosure and the following examples, the novel compounds of the following structural formula:

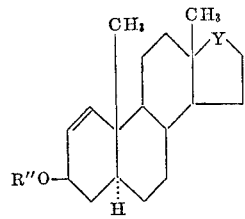

wherein R″ is hydrogen or a lower alkanoyl or tetrahydropyran 12-yl radical and Y is a carbonyl or ethylenedioxymethylene group, are useful as intermediates in the manufacture of the 17α-alkenyl/alkynyl compounds of the present invention.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.). Quantities of materials are expressed in parts by weight unless otherwise noted.

EXAMPLE 1

To a solution of 48.9 parts of 5α-androst-1-ene-3β,17β-diol 17-acetate in 523 parts of methylene chloride is added successively 54.4 parts of dihydropyran and 0.025 part of p-toluenesulfonic acid monohydrate. After storage at room temperature for about 72 hours, the reaction mixture is washed successively with water and 5% aqueous sodium bicarbonate, then is dried over anhydrous potassium carbonate and distilled to dryness under reduced pressure to afford an oily residue. Purification of the latter material by recrystallization from hexane containing a trace of pyridine affords 5α-androst-1-ene-3β,17β-diol 17-acetate,3-tetrahydropyran-2-yl ether, melting at about 126°.

EXAMPLE 2

To a solution of 1.5 parts of 5α-androst-1-ene-3β,17β-diol 17-acetate,3-tetrahydropyran-2-yl ether in 24 parts of methanol is added a solution of 0.9 part of potassium hydroxide in 6 parts of water, and that reaction mixture is heated at the reflux temperature for about one hour. The addition of water to the mixture results in precipitation of the crude product, which is collected by filtration, then purified by recrystallization from aqueous methanol to afford pure 5α-androst-1-ene-3β,17β-diol 3-tetrahydropyran-2-yl ether, which displays a melting point of about 128–132° and an optical rotation, in chloroform, of +26°.

EXAMPLE 3

A mixture containing 40 parts of 5α-androst-1-ene-3β,17β-diol 3-tetrahydropyran-2-yl ether, 114 parts of cyclohexanone and 870 parts of toluene is distilled until anhydrous, during which time approximately 200 parts by volume of distillate is collected. At that point, a solution of 40 parts of aluminum isopropoxide in 435 parts of toluene is added dropwise, over a period of about 15–20 minutes, to the refluxing solution. The reaction mixture is heated at the reflux temperature for about 2 hours longer, then is diluted by the dropwise addition of a solution of 115 parts of sodium potassium tartrate in 170 parts of water. The resulting mixture is steam distilled in order to remove volatile organic materials, and the solid product which separates is collected by filtration, then is extracted with ether. The organic solution thus obtained is washed successively with water and saturated aqueous sodium chloride, then is dried over anhydrous sodium sulfate. Removal of the solvent by distillation under reduced pressure affords the solid crude product, which is purified by recrystallization from hexane to yield 3β-tetrahydropyran-2-yloxy-5α-androst-1-en-17-one, melting at about 142–143° and displaying an optical rotation, in chloroform, of +20.5°. This compound is represented by the following structural formula:

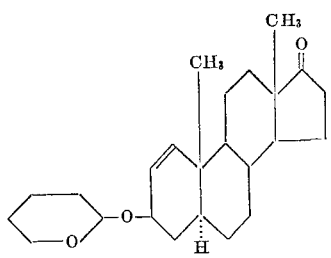

EXAMPLE 4

To a solution of 23.8 parts of 3β-tetrahydropyran-2-yloxy-5α-androst-1-en-17-one in 400 parts of ethanol, under nitrogen, is added a solution of 11.5 parts of p-toluenesulfonic acid monohydrate in 25 parts of water. The resulting reaction mixture is stored at room temperature for about 16 hours, then is poured carefully into ice water. The precipitate which separates is isolated by filtration, then is washed on the filter with water and dried in air to yield the crude product. Recrystallization of that material from aqueous ethanol followed by chromatography on silica gel and elution with 25% ethyl acetate in benzene affords 3β-hydroxy-5α-androst-1-en-17-one, melting at about 179–182° and displaying an optical rotation, in chloroform, of +197°. This compound is represented by the following structural formula:

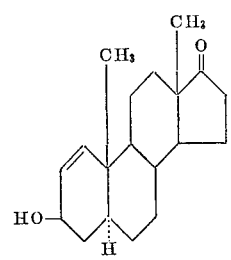

EXAMPLE 5

A solution of 30 parts of 5α-androst-1-ene-3,17-dione in 700 parts by volume of 2-ethyl-2-methyl-1,3-dioxolane containing 4 parts of p-toluenesulfonic acid monohydrate is heated at the reflux temperature for about 60 hours, during which time the butanone formed is allowed to distill.

The reaction mixture is then cooled, diluted with ether, washed with water and dried over anhydrous potassium carbonate containing decolorizing carbon. Distillation of the solvent under reduced pressure affords an oily residue containing 5α-androst-1-ene-3,17-dione 3,17-bis-ethylene ketal. That material is adsorbed on a silica gel chromatographic column and eluted with 5% ethyl acetate in benzene to afford the crude product, which is purified further by recrystallization from acetone, thus affording 5α-androst-1-ene-3,17-dione 17-ethylene ketal, melting at about 117–180° and displaying an optical rotation, in chloroform, of +33.5°.

EXAMPLE 6

To a mixture of 3 parts of lithium aluminum hydride with 56 parts of ether, in a nitrogen atmosphere, is added with stirring over a period of about 90 minutes, a solution of 6 parts of 5α-androst-1-ene-3,17-dione 17-ethylene ketal in 120 parts of ether containing 25 parts of dioxane. The reaction mixture is stored at room temperature for about 2½ hours longre, at the end of which time a solution of 3 parts of water in 16 parts of acetone is added carefully. The resulting mixture is poured slowly into approximately 250 parts of water, and the ether layer is separated, then washed successively with water and 5% aqueous bicarbonate. Drying of that solution over anhydrous potassium carbonate containing decolorizing carbon followed by distillation of the solvent under reduced pressure results in an oily residue which solidifies upon standing. Recrystallization of that crude product from acetone-hexane affords 3β-hydroxy-5α-androst-1-en-17-one 17-ethylene ketal, which melts at about 131–133° and is represented by the following structural formula:

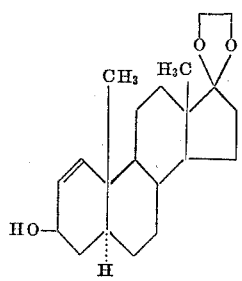

EXAMPLE 7

To a solution of 4 parts of 3β-hydroxy-5α-androst-1-en-17-one 17-ethylene ketal in 40 parts of ethanol is added 24 parts of concentrated hydrochloric acid, and the resulting reaction mixture is warmed slightly for several minutes, then is allowed to stand at room temperature for about 30 minutes. At the end of that time, the reaction mixture is poured into ice and water, and the resulting aqueous mixture is extracted with ether. The ether layer is separated, washed successively with water and 5% aqueous sodium bicarbonate, then dried over anhydrous potassium carbonate containing decolorizing carbon. Distillation of the solvent under reduced pressure affords an oily residue, which is purified by chromatography on silica gel followed by elution with 5% ethyl acetate in benzene. The eluted material is further purified by recrystallization from aqueous methanol to afford 3β-hydroxy-5α-androst-1-en-17-one, which is identical with the product of Example 4.

EXAMPLE 8

To a solution of 20 parts of 17β-hydroxy-5α-androst-1-en-3-one in 30 parts of methylene chloride containing 22.2 parts of dihydropyran is added 0.01 part of p-toluenesulfonic acid, and the resulting reaction mixture is stored at room temperature for about 72 hours. That mixture is then washed successively with water and 5% aqueous sodium bicarbonate, at which time it is dried over anhydrous potassium carbonate containing decolorizing carbon. Removal of the solvent by distillation under reduced pressure affords a yellow oily residue, which is purified by recrystallization from aqueous methanol to afford pure 17β-tetrahydropyran-2-yloxy-5α-androst-1-en-3-one, melting at about 94–96°.

To a slurry of 13 parts of lithium aluminum hydride in 170 parts of ether is added, with stirring over a period of about 2 hours, a solution of 25 parts of 17β-tetrahydropyran-2-yloxy-5α-androst-1-en-3-one in 175 parts of ether. Stirring of the reaction mixture is continued at room temperature for about 2 hours. The excess reagent is destroyed by careful addition of aqueous acetone, and the resulting mixture is then poured slowly into ice and water. The layers are separated, and the aqueous layer is extracted with ether. The combined organic solutions are then washed several times with water, dried over anhydrous potassium carbonate containing decolorizing carbon and distilled to dryness to afford an oily residue. The crude product is purified by recrystallization first from aqueous methanol, then from hexane to yield pure 17β-tetrahydropyran-2-yloxy-5α-androst-1-en-3β-ol, melting at about 130–133°.

A mixture containing 15 parts of 17β-tetrahydropyran-2-yloxy-5α-androst-1-en-3β-ol, 110 parts of acetic anhydride and 220 parts of pyridine is stored at room temperature for about 16 hours, then is poured carefully into approximately 800 parts of water. That aqueous mixture is extracted with ether, and the ether layer is separated, washed successively with 5% aqueous sodium bicarbonate, dilute hydrochloric acid and 5% aqueous sodium bicarbonate, then dried over anhydrous potassium carbonate containing decolorizing carbon. That dried solution is stripped of solvent by distillation under reduced pressure to afford, as an oil, 5α-androst-1-ene-3β,17β-diol 3-acetate, 17-tetrahydropyran-2-yl ether. This compound displays, in chloroform, infrared absorption maxima at about 3.39, 5.77, 7.96, 9.31 and 9.76 microns.

EXAMPLE 9

A mixture containing 12 parts of 5α-androst-1-ene-3β,17β-diol 3-acetate,17-tetrahydropyran-2-yl ether, 5.6 parts of p-toluenesulfonic acid monohydrate and 120 parts of methanol is allowed to stand at room temperature for about 45 minutes, then is poured carefully into approximately 500 parts of water. The resulting aqueous mixture is neutralized by the addition of 2 parts of sodium bicarbonate, and the precipitate which forms is collected by filtration, washed on the filter with water and dried to afford 5α-androst-1-ene-3β,17β-diol 3-acetate, which is characterized by infrared absorption maxima, in chloroform, at about 2.75, 3.41, 5.78, 7.97 and 9.77 microns.

EXAMPLE 10

To a solution of 4.5 parts of 5α-androst-1-ene-3β,17β-diol 3-acetate in 80 parts of acetone is added dropwise an aqueous solution, 8 N in chromium trioxide and 8 N in sulfuric acid, until a slight excess of the reagent is present. The excess reagent is then destroyed by the addition of a small quantity of isopropyl alcohol, and the inorganic salts formed are removed by filtration through diatomaceous earth. The filtrate is diluted with water, then is extracted with ether. The ether layer is separated, dried over anhydrous potassium carbonate and stripped of solvent by distillation under reduced pressure to afford an oily residue which partially solidifies upon standing. That material is further purified by adsorption on a silica gel chromatographic column followed by elution with 10% of ethyl acetate in benzene. The eluted material is recrystallized from hexane to yield pure 3β-acetoxy-5α-androst-1-en-17-one, which melts at about 153–155° and exhibits an optical rotation, in chloroform, of +129.5°.

This compound is represented by the following structural formula:

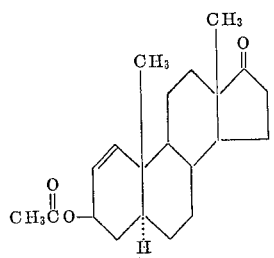

EXAMPLE 11

When an equivalent quantity of propionic anhydride is substituted in the procedure of Example 8, there is produced 5α-androst-1-ene-3β-17β-diol 3-propionate,17-tetrahydropyran-2-yl ether.

The substitution of an equivalent quantity of 5α-androst-1-ene-3β,17β,-diol 3-propionate,17-tetrahydropyran-2-yl ether in the procedure of Example 9 results in 5α-androst-1-ene-3β,17β-diol 3-propionate.

By substituting an equivalent quantity of 5α-androst-1-ene-3β,17β-diol 3-propionate and otherwise proceeding according to the processes described in Example 10, there is produced 3β-propionoxy-5α-androst-1-en-17-one.

EXAMPLE 12

Method A

To a mixture of 25 parts of the 30% lithium acetylide-70% ethylene diamine complex with 225 parts of tetrahydrofuran is added dropwise, over a period of about 30 minutes, a solution of 9.5 parts of 3β-acetoxy-5α-androst-1-en-17-one in 90 parts of tetrahydrofuran. That reaction mixture, in a nitrogen atmosphere, is stirred at room temperature for about 3 hours, then is diluted carefully with water. The precipitate which forms is collected by filtration, washed on the filter successively with 5% hydrochloric acid and water, then dried in air. The resulting crude product is recrystallized from aqueous methanol to afford 17α-ethynyl-5α-androst-1-ene-3β,17β-diol, melting at about 201–204°. This compound is represented by the following structural formula:

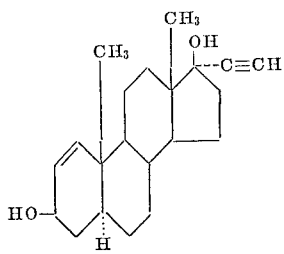

Method B

To 630 parts of refluxing tertiary-amyl alcohol is added 28.8 parts of potassium metal in small portions while the mixture is rapidly stirred. Following that addition period, the mixture is heated at the reflux temperature for about 30 minutes longer, then is cooled to approximately 0° by means of an ice bath. Acetylene gas is then bubbled over the surface of the mixture for about 45 minutes, at the end of which time 7.8 parts of 3β-hydroxy-5α-androst-1-en-17-one is added. That reaction mixture is stirred for about 7 hours with cooling, during which time the addition of acetylene gas is continued. The mixture is allowed to stand for about 16 hours, then is poured into ice and water. Extraction of that aqueous mixture with ether affords an organic solution, which is washed successively with dilute hydrochloric acid, water and saturated aqueous sodium chloride, then dried over anhydrous sodium sulfate. Removal of the solvent by distillation under reduced pressure affords an oily residue, which is purified by recrystallization from aqueous methanol to yield 17α-ethynyl-5α-androst-1-ene-3β,17β-diol, identical with the product of Method A.

EXAMPLE 13

To a solution of 3.9 parts of 17α-ethynyl-5α-androst-1-ene-3β,17β-diol in 300 parts of pyridine is added 0.4 part of 5% palladium-on-carbon catalyst, and the resulting reaction mixture is shaken with hydrogen at atmospheric pressure and room temperature for about 15 minutes. Dilution with water followed by cooling to 0–5° results in separation of a precipitate, which is collected by filtration, then extracted into ether. The ether solution is washed with water, dried over anhydrous sodium sulfate and concentrated to dryness under reduced pressure. Recrystallization of the resulting residue from aqueous methanol results in 17α-vinyl-5α-androst-1-ene-3β,17β-diol.

EXAMPLE 14

By substituting an equivalent quantity of propyne in the procedure of Example 12, Method B, there is produced 17α-propynyl-5α-androst-1-ene-3β,17β-diol.

EXAMPLE 15

When an equivalent quantity of 17α-propynyl-5α-androst-1-ene-3β,17β-diol is substituted in the procedure of Example 13, there is obtained 17α-propenyl-5α-androst-1-ene-3β,17β-diol.

EXAMPLE 16

A mixture of 2 parts of 17α-ethynyl-5α-androst-1-ene-3β,17β-diol, 20 parts of acetic anhydride and 40 parts of pyridine is heated at the reflux temperature, under nitrogen, for about 4 hours, then is stored at room temperature for about 16 hours. The reaction mixture is then poured into water, and the resulting aqueous mixture is extracted with ether. The ether layer is separated, washed successively with water, dilute aqueous sodium carbonate, dilute hydrochloric acid and dilute aqueous sodium bicarbonate, then dried over anhydrous potassium carbonate containing decolorizing carbon. Concentration of the organic solution to dryness by distillation under reduced pressure affords the residual crude product, which is purified by recrystallization from aqueous methanol to yield 17α-ethynyl-5α-androst-1-ene-3β,17β-diol 3,17-diacetate.

EXAMPLE 17

When the procedure of Example 16 is carried out at room temperature for about 16 hours, there is produced 17α-ethynyl-5α-androst-1-ene-3β,17β-diol 3-acetate.

EXAMPLE 18

By substituting an equivalent quantity of propionic anhydride and otherwise proceeding to the processes described in Example 16, there is produced 17α-ethynyl-5α-androst-1-ene-3β,17β-diol 3,17-dipropionate.

EXAMPLE 19

The substitution of an equivalent quantity of propionic anhydride in the procedure of Example 17 results in 17α-ethynyl-5α-androst-1-ene-3β,17β-diol 3-propionate.

What is claimed is:
1. A compound of the formula:

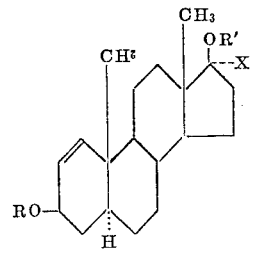

wherein R and R' are selected from the group consisting of hydrogen and lower alkanoyl and X is a lower unsaturated aliphatic hydrocarbon radical.

2. As in claim 1, a compound of the formula:

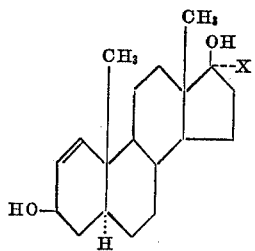

wherein X is a lower unsaturated aliphatic hydrocarbon radical.

3. As in claim 1, a compound of the formula:

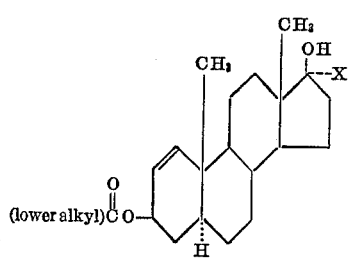

wherein X is a lower unsaturated aliphatic hydrocarbon radical.

4. As in claim 1, a compound of the formula:

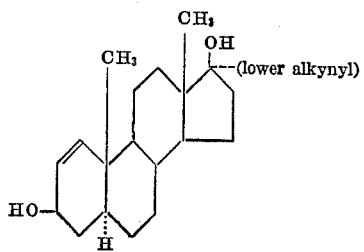

5. As in claim 1, the compound which is 17α-ethynyl-5α-androst-1-ene-3β,17β-diol.

6. A compound of the formula:

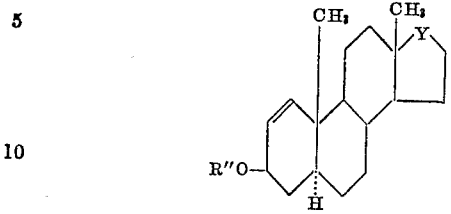

wherein R'' is selected from the group consisting of hydrogen, lower alkanoyl and tetrahydropyran-2-yl and Y is a member of the class consisting of carbonyl and ethylenedioxymethylene.

7. As in claim 6, the compound which is 3β-hydroxy-5α-androst-1-en-17-one 17-ethylene ketal.

8. As in claim 6, the compound which is 3β-acetoxy-5α-androst-1-en-17-one.

9. As in claim 6, the compound which is 3β-hydroxy-5α-androst-1-en-17-one.

10. As in claim 6, the compound which is 3β-tetrahydropyran-2-yloxy-5α-androst-1-en-17-one.

References Cited

UNITED STATES PATENTS

| | | | |
|---|---|---|---|
| 3,264,287 | 8/1966 | Wettstein et al. | 260—239.55 |
| 2,843,609 | 7/1958 | Colton | 260—397.5 |

FOREIGN PATENTS

| | | |
|---|---|---|
| 1,079,040 | 4/1960 | Germany. |

HENRY A. FRENCH, *Primary Examiner.*

U.S. Cl. X.R.

260—397.4, 397.5, 999